July 4, 1961  I. WEBER  2,990,712
TESTING INK ABRASIVENESS
Filed Sept. 2, 1958  2 Sheets-Sheet 1
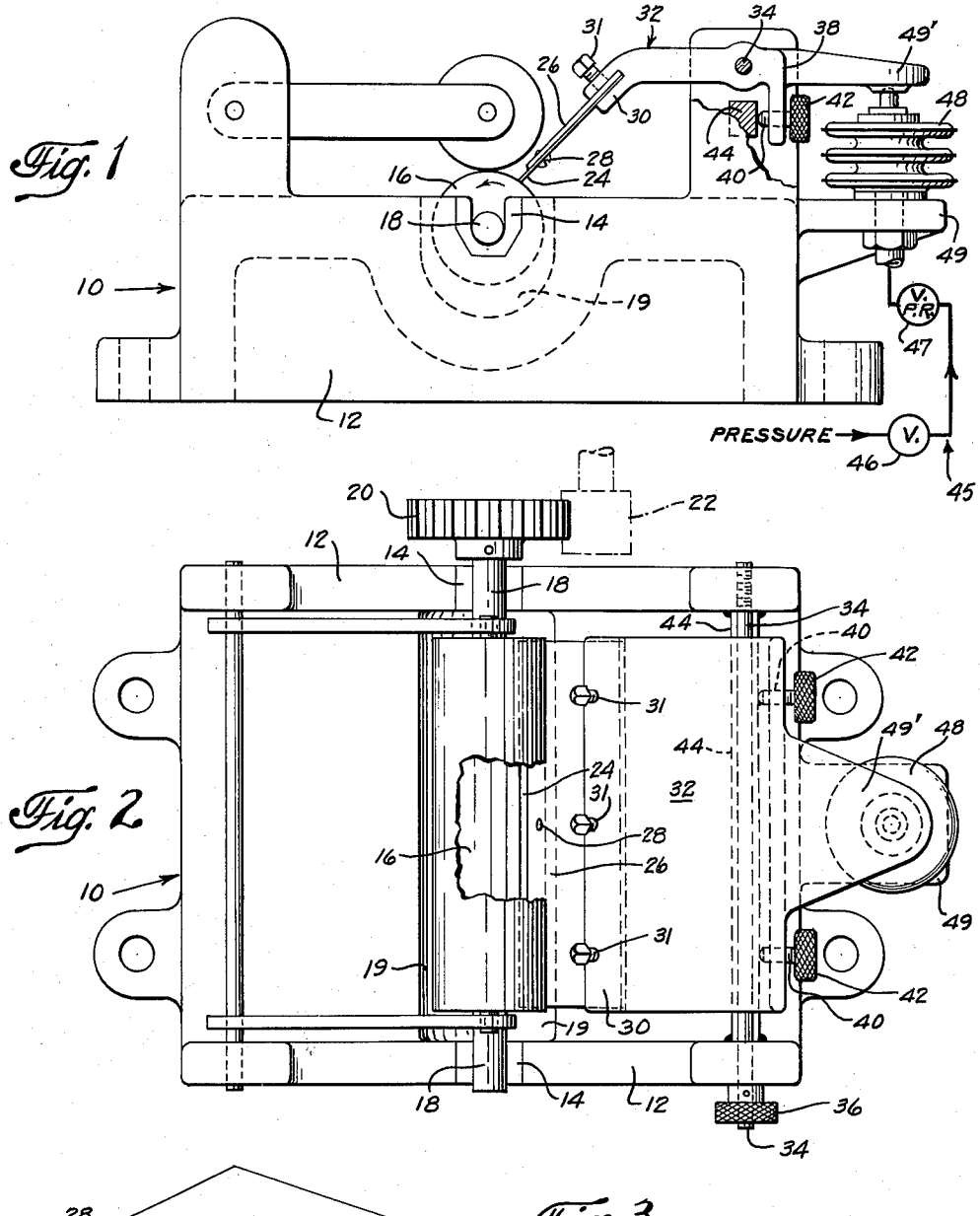
INVENTOR.
IRA WEBER
BY
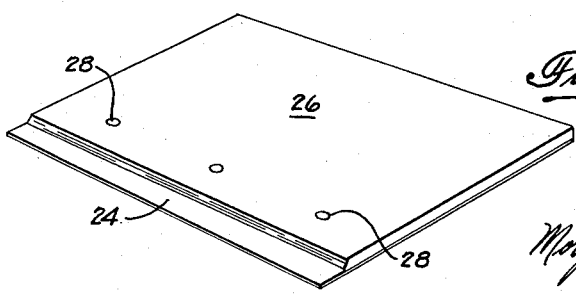
ATTORNEYS.

July 4, 1961  I. WEBER  2,990,712
TESTING INK ABRASIVENESS
Filed Sept. 2, 1958  2 Sheets-Sheet 2

INVENTOR.
IRA WEBER
BY
Morgan, Finnegan, Durham & Pine
ATTORNEYS.

United States Patent Office 2,990,712
Patented July 4, 1961

2,990,712
TESTING INK ABRASIVENESS
Ira Weber, Long Island City, N.Y., assignor to American-Marietta Company, New York, N.Y., a corporation of Illinois
Filed Sept. 2, 1958, Ser. No. 758,239
1 Claim. (Cl. 73—7)

The present invention relates to a novel and improved apparatus for testing the abrasive qualities of gravure inks.

The objects and advantages of the invention will be set forth in part hereinafter and in part will be obvious herefrom, or may be learned by practice with the invention, the same being realized and attained by means of the parts, combinations and steps pointed out in the appended claim.

The invention consists in the novel steps, construction, arrangements, combinations and improvements herein shown and described.

The present invention has for its object the provision of a novel and improved, relatively simple and inexpensive apparatus by which it is possible to measure quickly and accurately the abrasiveness of a rotary photogravure or other fluid printing ink containing a finely divided pigment, and which may contain solid, deleteriously abrasive particles beyond those present as pigment or coloring matter.

The accompanying drawings, referred to herein and constituting a part hereof, illustrate embodiments of the invention, and together with the description, serve to explain the principles of the invention.

In the drawings:

FIGURE 1 is a side elevation of one embodiment of the present invention showing testing apparatus particularly adapted to carry out the method of the present invention;

FIGURE 2 is a top plan view of the apparatus shown in FIGURE 1, certain portions being broken away to show more clearly other parts of the apparatus;

FIGURE 3 is a perspective view showing the assembly of the blade member and its supporting member, as used in the apparatus illustrated in FIGURES 1 and 2;

Figure 4:
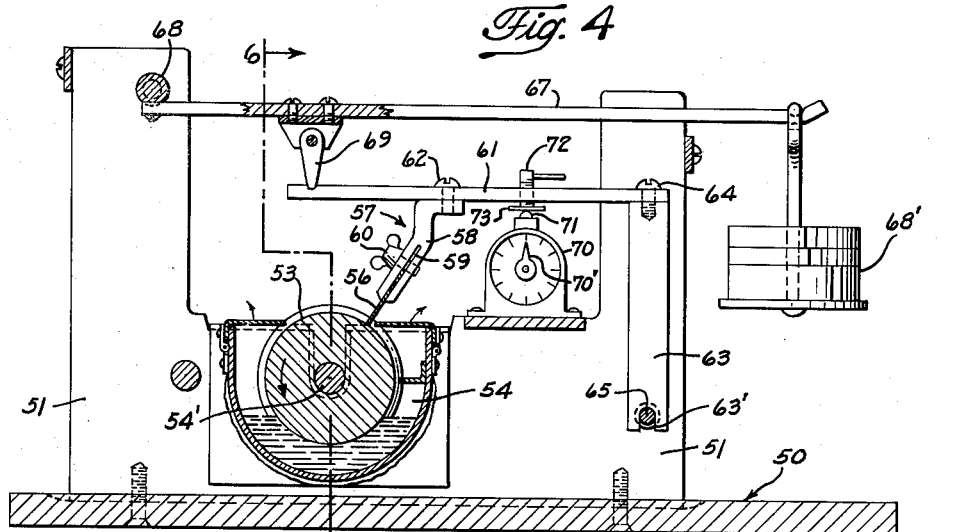
FIGURE 4 is a side elevation of another embodiment of the invention for determining abrasive qualities of gravure inks.

Still another object is the provision of a novel and improved apparatus which makes it commercially feasible and economically possible to determine in advance of the use of a rotary photogravure printing ink in a printing press, the extent to which a particular ink may cause premature failure of the relatively soft design-bearing, and relatively expensive printing cylinders, so that such cylinders need not be replaced before they have been able to complete their normal expected life.

In rotary photogravure printing, the minutely cellular surface of a printing cylinder is supplied with a film of a fluid ink, and after the surface of the cylinder has been wiped to remove all of the ink which is not contained within the minute cells, the surface of the cylinder is pressed against the surface of a running web of paper to transfer the ink within the cells to the surface of the paper, thereby forming the desired impression on the web of paper.

In commercial practice, rotary photogravure printing cylinders are invariably made with at least their surface of copper. These surfaces are minutely etched to provide many thousands of cells per square inch, each cell being of a particular depth as determined by the tone to be reproduced thereby, the maximum depth of any of the cells being of the order of one or two thousandths of an inch. The ink used comprises a relatively thin fluid of volatile solvent containing a small amount of a binder and a coloring pigment. Ordinarily, the surface of the printing cylinder is immersed in such an ink, or a stream of such ink is applied to the surface of the cylinder, after which all of the film of ink, excepting only that portion which lies within and is contained in the minute cells on the surface of the cylinder, is removed by the powerful wiping action of a steel blade which is firmly pressed against the surface of the rapidly rotating cylinder and wipes off the excess ink just before the wiped surface of the cylinder is pressed against the surface of the paper web moving at substantially the same speed as the surface of the cylinder.

In view of the fact that the surface of the cylinder is formed of relatively soft copper, and the doctor knife or steel blade used for wiping is formed of much harder and more abrasive-resistant steel, the copper surface wears faster than the blade. This action prevails in spite of the fact that the thickness of the steel blade where it makes contact with the copper surface of the cylinder is only about 0.005″ to 0.010″ while the circumference of the cylinder is often as large as 45 or 50 inches. Even under such conditions, it is often expected that a given cylinder will continue to produce satisfactory printed impressions after printing as many as 1,000,000 impressions, and the commercial printing operation is based upon a given expected life of such a cylinder.

In case a photogravure cylinder does not give the expected number of impressions, it is necessary to replace it with a new cylinder, and in case such a new cylinder is not immediately available, the printing press, with its entire crew of expensive labor, must be shut down while the time-consuming process of preparing a new cylinder is carried out. This process is complicated even more where the printing cylinder is one of a set of three or four adapted to print a given impression in multi-color and where the several cylinders of the set require extensive hand-work and reetching so that they will match each other to give the desired multi-color impression. In view of the expense of such possible shut-downs, it is the usual practice to provide spare cylinders which are immediately available, but may never be used, against the possibility that one or more of the printing cylinders for a given edition may need replacement before the run of the edition has been completed.

At conventional speeds of operation, as now commercially practiced, it is not unusual for a rotary photogravure printing press to produce more than 400,000 revolutions a day (24 hour operation), but even so, it often takes as much as two days to wear out a particular cylinder, although under less favorable conditions of operation, a rotary photogravure printing cylinder may wear out in as short a period of time as only a few hours. While there are many factors which may contribute to the short-life of a given printing cylinder, most of the factors are predictable and an experienced press-operator can make the proper adjustments of the position and pressure of the doctor knife, the gain of the paper web, and the like so as to get the optimum life from the costly cylinder. However, he has no control over the abrasive quality of the ink which he feeds to the cylinder, and an ink of unusually abrasive character can create unfavorable conditions which cannot be overcome by any measures which can be resorted to by the press-operator, and it often occurs that a cylinder will wear out in as few as 10,000 revolutions (20,000 impressions)

or in approximately one-half hour of printing operation.

The present invention provides an extremely simple inexpensive, rapid and reliable apparatus for determining in advance the abrasive quality of a photogravure ink, so that the ink-maker may make such determinations before shipping the ink to the printing plant, thereby enabling the press-operator to use the ink with the assurance of an expected life of the printing cylinders. It also enables the inkmaker to test each batch of ink and to take the necessary steps to correct the batch of ink or to reject it before delivering it for use by the press-operator.

In accordance with the present invention, a representative sample of the rotary photogravure ink to be tested for abrasiveness is continuously fed to the surface of a rapidly rotating cylinder, formed of a relatively hard material such as steel, and which is preferably minutely irregular on its surface so as to prevent rapid drainage of the ink by gravity as the cylinder rotates. The surface of the cylinder, carrying the film of ink to be tested is then subjected to the wiping action of a doctor blade made of relatively soft material, such as copper, which is pressed against the surface of the ink-bearing cylinder with a uniform pressure for a standard period of time while the cylinder is rotated at a standard number of revolutions per minute.

Thus, the cylinder having a diameter of 3 inches and rotating at a constant speed of about 100 revolutions per minute with the ink supplied thereto in a uniform manner, may be wiped by means of previously-weighed copper blade, 0.010" thick bearing against the surface of the cylinder at an angle of several degrees, preferably about 5° to the radius at the point of contact of the blade with the cylinder. After rotating in this manner, while the cylinder is supplied with the ink to be tested, the apparatus is stopped and the copper blade is removed and weighed to determine the amount of copper which has been worn away by the abrasive action of the ink. In view of the great disparity between the hardness of the steel cylinder and the soft copper blade, it can be assumed that all of the significant wear, has taken place on the copper blade, and that the loss of weight of the copper blade is an accurate indication of the abrasive quality of the ink. By calculation, confirmed by empirical tests, it can be shown that a given number of revolutions of the test cylinder of a given diameter against the soft copper blade of a given thickness are equal to many thousand times more revolutions of a copper-surfaced cylinder as wiped by a steel blade in a conventional rotary photogravure printing press.

In carrying out the method, the same copper blade may be used for many successive tests, and it is only necessary to weigh it at the end of each test, the several tests being carried out for a given number of revolutions. For example, with a copper blade weighing 30.059 grams at the beginning of the test and weighing 30.014 grams at the end of the test which had comprised 1000 revolutions of the cylinder coated with the particular ink to be tested, showing a wear of 0.045 gram on the blade, it could be predetermined that under normal conditions of printing, such an ink should be expected to give a cylinder life of 777,000 impressions compared with a different ink which produced a blade wear of 0.050 gram and produced a cylinder life of 700,000 impressions. If the blade showed a wear of 0.500 gram under standard conditions, the cylinder could be expected to show a life of only 70,000 impressions. Likewise, a wear of only 0.025 gram would indicate a cylinder life of 1,400,000 impressions.

On the basis of these predetermined results, the press operator, and the plant superintendent can predict with a high degree of accuracy the cylinder life, and the proper number of cylinders needed for a given edition can be accurately predicted, which has not heretofore been the case.

One preferred and illustrative form of apparatus for carrying out the present invention is shown in the FIGS. 1–3. As embodied therein, there is provided a base member 10 which is provided with side frames 12 having aligned journals 14 at each side thereof. Received in the journals 14 is a cylinder 16 having protruding shaft ends 18, the cylinder being formed of relatively hard steel, and preferably of case hardened steel, its surface being minutely cavitated to provide ink-receiving cells which are capable of holding ink by capillarity, but which do not present an abrasive or roughened exterior surface.

The base member 10 is formed with a longitudinally extending trough cavity 19, extending from one journal 14 to the other and adapted to receive the cylinder 16 so that the cylinder may rotate within the body of ink contained within the trough cavity 18.

Means are provided for rotating the cylinder 16 at a standardized speed, such as 100 r.p.m. and may comprise the gear 20 fixed to shaft 18, meshing with the pinion 22 of an electric motor, not shown, which may be driven for the desired period at a constant rate of rotation, cylinder 16 being driven in a counter-clockwise direction in the position shown in FIGURE 1, so that blade 24 wipes the ink from the surface of cylinder 16. This rotation may continue for a standardized period of time, such as 5 or 10 minutes, or whatever other period is convenient. If desired a suitable revolution counter may be coupled with the roller 16 or drive mechanism therefor.

Blade 24 is formed of a relatively thin sheet of soft and preferably annealed copper of a standardized thickness, such as 0.010", care being taken that the copper is of substantially uniform softness so that its wear-characteristics will be uniform. This thin copper blade is supported for stiffness by means of a rigid metal plate 26 of considerably greater thickness and preferably formed of steel, the plate leaving exposed only a narrow edge of the copper blade member 24. The copper blade member is detachably secured to one side of the steel plate 26 by suitable clamping means such as screws 28 which may pass through the copper blade and clamp it to the steel plate 26.

Means are provided for supporting the knife blade 24 and its backing plate 26 in a standardized position with respect to the rotating ink entraining cylinder 16, and for pressing the blade against the cylinder with a standardized pressure. As embodied, the upper end of the blade 24 and backing plate 26 are received in a closely fitted slot formed as the forward jaw-end 30 of a supporting member 32 which is pivotally mounted on a shaft 34 extending from one side frame 12 to the other and parallel to the axis of the cylinder 16. Clamping screws 31 are provided in the jaw end 30 to firmly clamp the steel backing plate 26 and the copper blade 24 within the slot of the jaw-end 30. These screws are preferably positioned to make contact only with the steel member 26, thereby avoiding the possibility of error which would arise if they made contact with the copper blade member. Shaft 34 is preferably threaded at one end to hold it in one of the side frames 12, while its other end is provided with a knurled head 36 by which it may be turned to engage it with or remove it from the threaded socket at its other end. A standardized or predetermined pressure of the blade 24 against the cylinder 16 may be maintained by the application of compressed air through a conduit system 45 which is pressure-regulated by valves 46 and 47. The compressed air is fed to an expansion-type bellows 48 formed of a suitable resilient material such as rubber and the like. The bellows has one extremity thereof secured to an extended flange member 49 integral to the base member 10, and the opposing end abuts the support member 32 at an extremity 49' opposite to the forward jaw-end 30. The application of compressed air to the bellows causes it to expand in a direction to urge the blade 24 against the cylinder. The blade pressure is proportional to the pressure of the compressed air applied to the bellows.

Means are provided for measuring the wear of the blade in linear units, rather than in weight, and these provide a more rapid, but less accurate determination of the rate at which the blade is abraded away by the ink. As embodied, the rear of the supporting member 32 is provided with a down-turned edge 38 in which are mounted a pair of spaced micrometer screws 40 having enlarged knurled and indexed heads 42, which may be calibrated to indicate thousandths of an inch wear of the blade 24. The forward ends of the screws 40 engage with a fixed stiff bar 44 extending from one side of frame 12 to the other, immediately below the shaft 34.

In operation, as the blade wears the support member 32 moves accordingly with the downturned edge moving outwardly and away from fixed bar 44. This causes a corresponding displacement of the micrometer screws 40 from the fixed bar so that an adjustment thereof in a direction to move them into touching engagement with the fixed bar will give an indication of the blade wear in thousandths of an inch.

Figure 5:
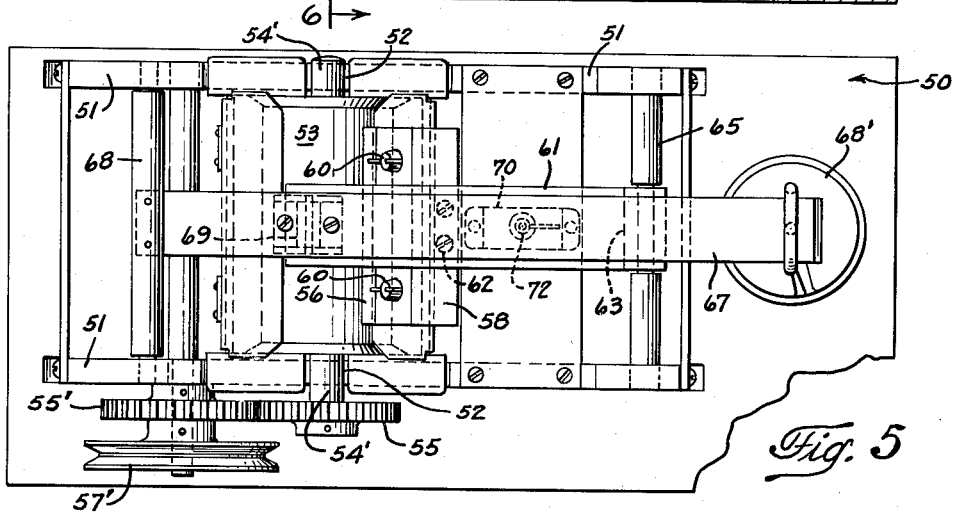
FIGURE 5 is a top plan view of the apparatus shown in FIGURE 4.
Figure 6:
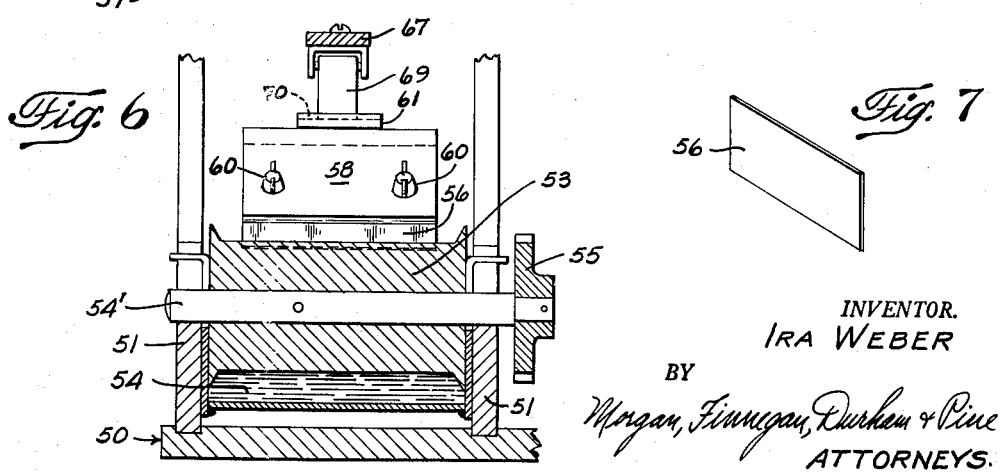
FIGURE 6 is a cross sectional view taken along the line 6—6 of FIGURE 4.
Figure 7:
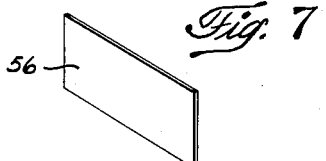
FIGURE 7 is a perspective view of the blade as used in the apparatus.

Another preferred and illustrative form of apparatus for carrying out the present invention is shown in FIGS. 4–7. In this embodiment there is provided a base member 50 having side frames 51 and aligned journals 52 at each side thereof. Received in the journals 52 is a cylinder 53 having protruding shaft ends 54'. This cylinder, as in the case of cylinder 16 in FIGS. 1–3, is formed of relatively hard steel and its surface is minutely cavitated to provide ink-receiving cells capable of holding ink by capillary action. A longitudinal trough 54 is formed in the base and extends between the side frames from one journal to the other for receiving the cylinder 53 in a body of ink contained therein.

Means for rotating the cylinder 53, as previously described, may include meshed gears 55 and 55', the former being carried by one cylinder shaft 54' and the latter being driven by means of a pulley 57' and belt system, not shown. In this manner the cylinder 53 may be driven at the required rotational speed for a predetermined period of time that may be required to make the test. The cylinder 53 is driven in a counterclockwise direction so that it will pick up ink in the trough just before engaging the wiping blade 56.

The blade 56 is made from a thin sheet of preferably annealed soft copper as previously explained with respect to the blade shown in FIG. 3. The blade is supported by a bracket member 57 having a fixed angular position relative to the cylinder 53. More specifically the bracket 57 includes an inclined portion 58 having a slotted jaw 59 for receiving the blade 56 and a clamping screw 60 threaded through the slotted portion for rigidly fixing the blade therein. The plate 57 is carried by a pivotally supported bar member 61 and secured thereto by means of mounting screws 62. The bar member 61 is secured to the upper end of an upright member 63, the latter having a slot 63' in the lower end thereof for rotatably engaging shaft 65.

The blade 56 is held in pressure contact with the rotatable cylinder by means of a gravity weight system comprising a generally horizontal support bar 67 pivotally mounted at one extremity to a rotatable shaft 68 carried between the frames 51. A fulcrum-like member 69 is carried by the bar 67 and bears against the left end of the member 61 as viewed in FIG. 4. A predetermined pressure is applied to the blade 56 by affixing weights 68' to the free or right hand end thereof. With this arrangement a substantially uniform pressure is applied to the blade 56 throughout relatively large changes in the angular positions of the elements and affords uniform test conditions at all times.

The rotational movement of the ink-coated cylinder causes the blade 56 to wear at its contacting edge in accordance with the abrasiveness of the ink, the time of operation or the number of revolutions of the cylinder. The amount of wear of the blade is a direct indication of the abrasive qualities of the gravure ink. To facilitate measurement of wear, visual means are provided in the form of a micrometer gage 70 carried by the base 50 and having a scale calibrated in appropriate units for indicating wear of the blade in linear units. Operation of the gage 70 is accomplished by reciprocable contact member 71 forming part of the gage and operable to move the pointer 70' an amount proportional to its displacement. The contact member 71 engages the flanged portion 73 of an adjustable screw 72 threadably engaging the support bar 61. At the start of a test, the blade 56 is urged against roller 53 with the desired force by adjusting the weights 68', and the screw 72 is rotated until the pointer 70' is in the zero position. During the course of the test any deviation of the pointer 70' from its zero position will be a direct measure of blade wear.

While only certain embodiments of the invention have been shown and described it is understood that alterations, changes and modifications may be made without departing from the true scope and spirit thereof.

I claim:

Apparatus for testing the abrasive quality of a fluid printing ink including in combination, a cylinder formed of a hard metal, an ink trough in which the cylinder rotates, a blade formed of a relatively softer material and means including air operated expandable bellows for pressing the blade against the rotating cylinder with a constant pressure and at a fixed angular position relative to the cylinder, said blade being formed as a thin sheet and being readily detachable for weighing.

References Cited in the file of this patent

UNITED STATES PATENTS

| | | |
|---|---|---|
| 337,729 | Auble | Mar. 9, 1886 |
| 895,980 | Derihon | Aug. 11, 1908 |
| 2,052,679 | Wainwright | Sept. 1, 1936 |
| 2,337,414 | Rieber | Dec. 21, 1943 |
| 2,582,223 | Blackburn et al. | Jan. 15, 1952 |